US010902053B2

(12) United States Patent
Biswas

(10) Patent No.: US 10,902,053 B2
(45) Date of Patent: Jan. 26, 2021

(54) SHAPE-BASED GRAPHICS SEARCH

(71) Applicant: ADOBE INC., San Jose, CA (US)

(72) Inventor: Sanjeev Kumar Biswas, Bangalore (IN)

(73) Assignee: ADOBE INC., San Jose, CA (US)

(*) Notice: Subject to any disclaimer, the term of this patent is extended or adjusted under 35 U.S.C. 154(b) by 303 days.

(21) Appl. No.: 15/851,412

(22) Filed: Dec. 21, 2017

(65) Prior Publication Data

US 2019/0197133 A1  Jun. 27, 2019

(51) Int. Cl.
*G06F 16/583* (2019.01)
*G06F 16/51* (2019.01)
*G06F 16/54* (2019.01)
*G06F 16/56* (2019.01)
*G06F 16/9535* (2019.01)
*G06K 9/46* (2006.01)
*G06K 9/62* (2006.01)

(52) U.S. Cl.
CPC ......... *G06F 16/5838* (2019.01); *G06F 16/51* (2019.01); *G06F 16/54* (2019.01); *G06F 16/56* (2019.01); *G06F 16/5854* (2019.01); *G06F 16/9535* (2019.01); *G06K 9/4604* (2013.01); *G06K 9/4638* (2013.01); *G06K 9/4642* (2013.01); *G06K 9/4671* (2013.01); *G06K 9/6202* (2013.01); *G06K 9/6204* (2013.01)

(58) Field of Classification Search
CPC .......................... G06F 16/5838; G06F 16/532
See application file for complete search history.

(56) References Cited

U.S. PATENT DOCUMENTS

| 4,542,412 A * | 9/1985 | Fuse | G06K 9/48 382/199 |
| 2005/0147312 A1* | 7/2005 | Chen | G06K 9/481 382/242 |

(Continued)

FOREIGN PATENT DOCUMENTS

WO   WO-2014198051 A1 * 12/2014
WO   WO-2017168125 A1 * 10/2017 ........... G06N 3/0454

OTHER PUBLICATIONS

Bhuiyan et al., "Recovering the control points of Bézier curves for line image indexing", 2002 (Year: 2002).*

(Continued)

*Primary Examiner* — Dawaune A Conyers
(74) *Attorney, Agent, or Firm* — Shook, Hardy & Bacon LLP

(57) ABSTRACT

Approaches are described for shape-based graphics search. Each graphics object of a set of graphics objects is analyzed. The analyzing includes determining an outline of the graphics object from graphics data that forms the graphics object. The outline of the graphics object is sampled resulting in sampled points that capture the outline of the graphics object. A shape descriptor of the graphics object is determined which captures local and global geometric properties of the sampled points. Search results of a search query are determined based on a comparison between a shape descriptor of a user identified graphics object and the shape descriptor of at least one graphics object of the set of graphics objects. At least one of the search results can be presented on a user device associated with the search query.

17 Claims, 9 Drawing Sheets

(56) References Cited

U.S. PATENT DOCUMENTS

| | | | |
|---|---|---|---|
| 2010/0254594 A1* | 10/2010 | Wang | G06T 11/00 |
| | | | 382/155 |
| 2012/0054177 A1 | 3/2012 | Wang et al. | |
| 2014/0169683 A1 | 6/2014 | Wang et al. | |
| 2017/0024384 A1* | 1/2017 | Kant | G06F 16/51 |
| 2017/0098152 A1* | 4/2017 | Kerr | G06F 3/04842 |
| 2017/0262479 A1* | 9/2017 | Chester | G06F 16/583 |

OTHER PUBLICATIONS

Hayashi et al., "Retrieval of 2D Vector Images by Matching Weighted Feature Points", 2008 (Year: 2008).*

Mathias Eitz, et al., Sketch-Based Image Retrieval: Benchmark and Bag-of-Features Descriptors, 14 pgs.

Y. Jhansi, et al. Sketch Based Image Retrieval with Cosine Similarity, International Journal of Advanced Research in Computer Science, Mar.-Apr. 2017, vol. 8, No. 3, 5 pgs.

Histogram of Oriented Gradients, Wikipedia https://en.wikipedia.org/wiki/Histogram_of_oriented_gradients (accessed Dec. 26, 2017).

Combined Search and Examination Report under Sections 17 & 18(3) dated Nov. 16, 2018 in United Kingdom Patent Application No. GB1806810.6, 9 pages.

\* cited by examiner

SHAPE-BASED GRAPHICS SEARCH

BACKGROUND

Example-based image search technologies allow users to provide an example image and receive search results that include visually similar images. In some conventional approaches, a large set of raster images are tagged using neural networks according to whether a particular image depicts particular types of objects or show particular characteristics. Search results can be determined based on how similar the tags of images are to tags of an example image. This approach may be suited for finding images that contain similar subject matter. However, a user may be interested in search results that contain similar shapes as an example image.

Conventional shape-based image search is optimized for photographs and other detailed graphics by leveraging shading and pixel colors. However, many vector graphics and some raster graphics (e.g., sketches) lack detail, which can lead to inaccurate search results. For example, these graphics may be lacking in internal detail and be strongly characterized by an overall footprint that is not well-captured using conventional approaches. Histogram of oriented gradients is an example of a conventional approach to capturing shapes in images that is more suitable for detailed images. All of the pixels of the image are divided into a grid of cells, and a histogram of gradient directions is created for each cell from its pixels. These gradient directions may not be sufficient to produce accurate shape-based search results for less detailed graphics.

SUMMARY

Aspects of the present disclosure provide for improvements to the capabilities of computers to identify and compare shapes of graphics objects, to produce more accurate graphical search results. In particular, the disclosure provides for a shape descriptor of a graphics object that forms a detailed representation of the overall footprint of the object, allowing for more accurate shaped based graphics search.

In various implementations, shape descriptors of graphics objects are determined and stored in a data store. A user can provide an example graphics object for a search query (e.g., by drawing a vector sketch), and a shape descriptor of the example object can be compared to the stored shape descriptors to determine graphics objects of similar shape for the search results. The shape descriptor of a graphics object can be determined by determining an outline (e.g., a set of connected Bézier curves) of the graphics object. The outline is sampled to generate sampled points that capture the outline. For each sampled point, the local and global geometric properties of the sampled point can be determined. As used herein, local and global geometric properties of a sampled point of a graphics object refers to one or more values that represents a geometric relationship between the sampled point relative to other sampled points of the graphics object (e.g., by referencing location geometry of other sampled points to the sampled point). The local and global geometric properties of each sampled point may be stored in a respective feature vector. The feature vectors of the sampled points can be combined into one or more aggregated feature vectors that form the shape descriptor.

In some cases, graphics objects may be tagged using any suitable approach according to whether the graphics objects depict particular types of objects or show particular characteristics (e.g., using machine learning and/or manual tagging). In determining the search results, a graphics object having a similar shape as the example object may be determined by analyzing its shape descriptor. Other graphics objects may be included in the search results based on sharing a similar or same tag as the determined graphics object. Using this approach, shape descriptors need not be determined and/or analyzed for at least some of these other graphics objects, thereby reducing the processing requirements for generating the search results.

BRIEF DESCRIPTION OF THE DRAWINGS

The present invention is described in detail below with reference to the attached drawing figures, wherein.

DETAILED DESCRIPTION

Figure 1:
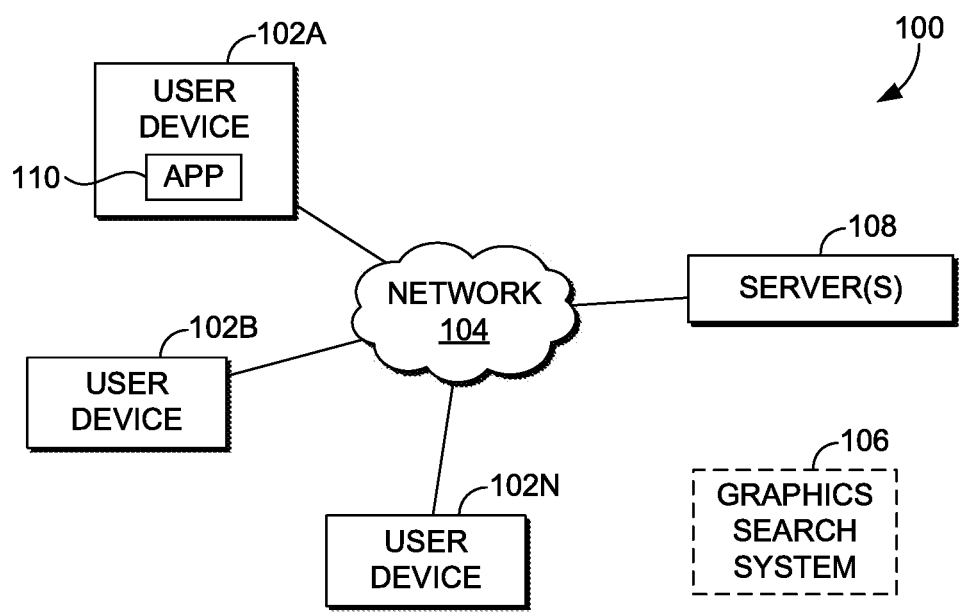
FIG. 1 is a block diagram showing an example of an operating environment, in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Conventional shape-based image search is optimized for photographs and other detailed graphics by leveraging the shading and color of pixels. For example, a photograph captures significant detail of all visible regions of a real world object that can be leveraged for shape recognition. Many vector graphics and some raster graphics lack similar information, which can lead to inaccurate search results. For example, when a user sketches (e.g., hand draws) an object, it may be strongly characterized by an overall footprint that is not well-captured using conventional approaches, resulting in lower quality search results. To illustrate the forgoing, a sketched object may not include much color, shading, and/or other detail, such that conventional approaches may not sufficiently capture that object for search. However, it may be desirable to allow a user to quickly sketch an example object and retrieve similar, but more detailed search results.

Histogram of oriented gradients is an example of a conventional approach to capturing shapes in images. All of the pixels of the image are divided into a grid of cells and a histogram of gradient directions is created for each cell from its pixels. These gradient directions may not capture the overall shape of many vector graphics and some raster graphics well enough to produce accurate search results when the graphics lack sufficient detail.

Aspects of the present disclosure provide for improvements to the capabilities of computers to identify and compare shapes of graphics objects, to produce more accurate graphical search results. In particular, the disclosure provides for a shape descriptor of a graphics object that forms a detailed representation of the overall footprint of the object, allowing for more accurate shaped based graphics search. Approaches described herein can leverage a vector art representation of an outline of a graphics object (e.g., connected Bézier curves and/or other vector primitives) to compute a shape descriptor of the graphics object. The shape descriptor can be used to search for similar vector graphics, which be stored in a vector file or other data object.

In various implementations, shape descriptors of graphics objects are determined and stored in a database (or other suitable data store). A user can provide an example graphics object for a search query, such as by drawing a vector sketch on a user device. The user can initiate a search for similar graphics objects on the user device in which a shape descriptor of the example object can optionally be generated or otherwise determined. The shape descriptor of the example object can be compared to the stored shape descriptors to determine graphics objects of similar shape for the search results.

The shape descriptor of a graphics object can be determined by determining an outline of the graphics object. The outline may be a vector object formed by a set of vector primitives such as connected Bézier curves. The outline may be sampled to generate sampled points that capture the outline using sampling techniques such as adaptive point sampling, where a number of sampled points for a segment of the outline is based on a length of the segment. The local and global geometric properties of the sampled points can be determined and may be stored in a respective feature vector. The shape descriptor comprises the feature vectors of the sampled points, which may be combined into one or more aggregated feature vectors.

A feature vector for a sampled point can be determined using various possible approaches. These include capturing the local and global geometric properties of sampled points in spatial and/or spectral domains. In an example spatial approach, a spatial histogram is created for each sampled point that captures the relative positions of other sampled points. For example, a geometric object (e.g., a circle) can be centered on a sampled point. The geometric object can be divided into equal sectors and the sectors can be further divided into bins. The feature vector for the sampled point can include a value for each bin, which is a count of the number of other sampled points that fall within that bin. Other suitable approaches to capturing the local and global geometric properties include determining heat kernel signatures of sampled points, skeletonization, and the like.

The shape descriptor of the graphics object (e.g., an example object) can then be compared to similarly determined shape descriptors of other graphics objects to generate search results. As later described in further detail, in some cases, the other graphics objects are tagged to facilitate the determination of search results. The graphics objects may be tagged using any suitable approach according to whether the graphics objects depict particular types of objects or show particular characteristics (e.g., using machine learning and/or manual tagging). In determining the search results, a graphics object having a similar shape as the example object may be determined by comparing its shape descriptor to the shape descriptor of the example object. Additional graphics objects may be included in the search results based on sharing a similar or same tag as the determined graphics object.

In some cases, shape descriptors need not be determined and/or analyzed for at least some of these other graphics objects, thereby reducing the processing requirements for generating the search results. For example, the tags may be determined using a conventional approach that assigns a confidence score to each tag and object or image pair. A subset of items (e.g., one or more graphics objects or images) may be selected for each tag based on the confidence score of the tag (e.g., the top ten scored items for each tag). Shape descriptors may then be determined for this subset of items, and other items may be included in search results with an item from the subset based on having the same or similar tags as the item.

Turning now to FIG. 1, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102A and 102B through 102N, network 104, and server(s) 108. It should be understood that operating environment 100 shown in FIG. 1 is an example of one suitable operating environment. Each of the components shown in FIG. 1 may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other disclosed components may be employed within operating environment 100 within the scope of the present disclosure. Each may comprise a single device or multiple devices cooperating in a distributed environment.

User devices 102A through 102N comprise any type of computing device capable of being operated by a user. For example, in some implementations, user devices 102A through 102N are the type of computing device described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out aspects of the present disclosure. In some implementations, the application(s) comprises a web application, which can run in a web browser, and could be hosted at least partially on the server-side of operating environment 100. In addition, or instead, the application(s) can comprise a dedicated application, such as media editing software, examples of which include Adobe Photoshop®, Adobe Illustrator®, and the like. In some cases, one or more applications represented by application 110 is integrated into the operating system (e.g., as a service). It is therefore contemplated herein that "application" be interpreted broadly.

Server(s) 108 also includes one or more processors, and one or more computer-readable media. The computer-readable media includes computer-readable instructions executable by the one or more processors. The instructions may optionally implement one or more components of graphics search system 106, described in additional detail below. However, the components may generally be implemented on any combination of server(s) 108, user devices 102A, and/or application(s) 110. Additionally, other components not shown may also be included within the distributed environment.

Thus, it should be appreciated that graphics search system 106 may be provided via multiple devices arranged in a distributed environment that collectively provide the functionality described herein, or may be embodied on a single device. In some cases, graphics search system 106 can be integrated, at least partially, into a user device, such as user device 102A. Furthermore, graphics search system 106 may at least partially be embodied as a cloud computing service.

For cloud-based implementations, the instructions on server 108 may implement one or more components of graphics search system 106, and application 110 may be utilized by a user to interface with the functionality implemented on server(s) 108. As mentioned above, in some cases, application 110 comprises a web browser. In other cases, server 108 may not be required. For example, the components of graphics search system 106 may be implemented completely on a user device, such as user device 102A. Thus, graphics search system 106 may be embodied at least partially by the instructions corresponding to application 110.

Graphics search system 106 can determine ranking scores (e.g., ranking scores 244) of one or more graphics items that comprise graphics objects, such as graphics data objects that include images of graphics objects and/or individual graphics objects. Graphics search system 106 can determine these ranking scores based on determining how similar shape descriptors of the graphics objects are to a shape descriptor of an example graphics object that corresponds to a search query. From the ranking scores, graphics search system 106 can determine which graphics objects to include in search results to the search query. In some embodiments, from a user device (e.g., user device 102A using application 110), a user can initiate the search, such as by sketching or otherwise identifying the example graphics object on a user device and optionally selecting a search button. The search results are determined by server(s) 108, and returned to the user device for display. The user may then optionally select one or more of the search results to import a corresponding graphics object into application 110 (e.g., for editing or other graphics composition).

Figure 2:
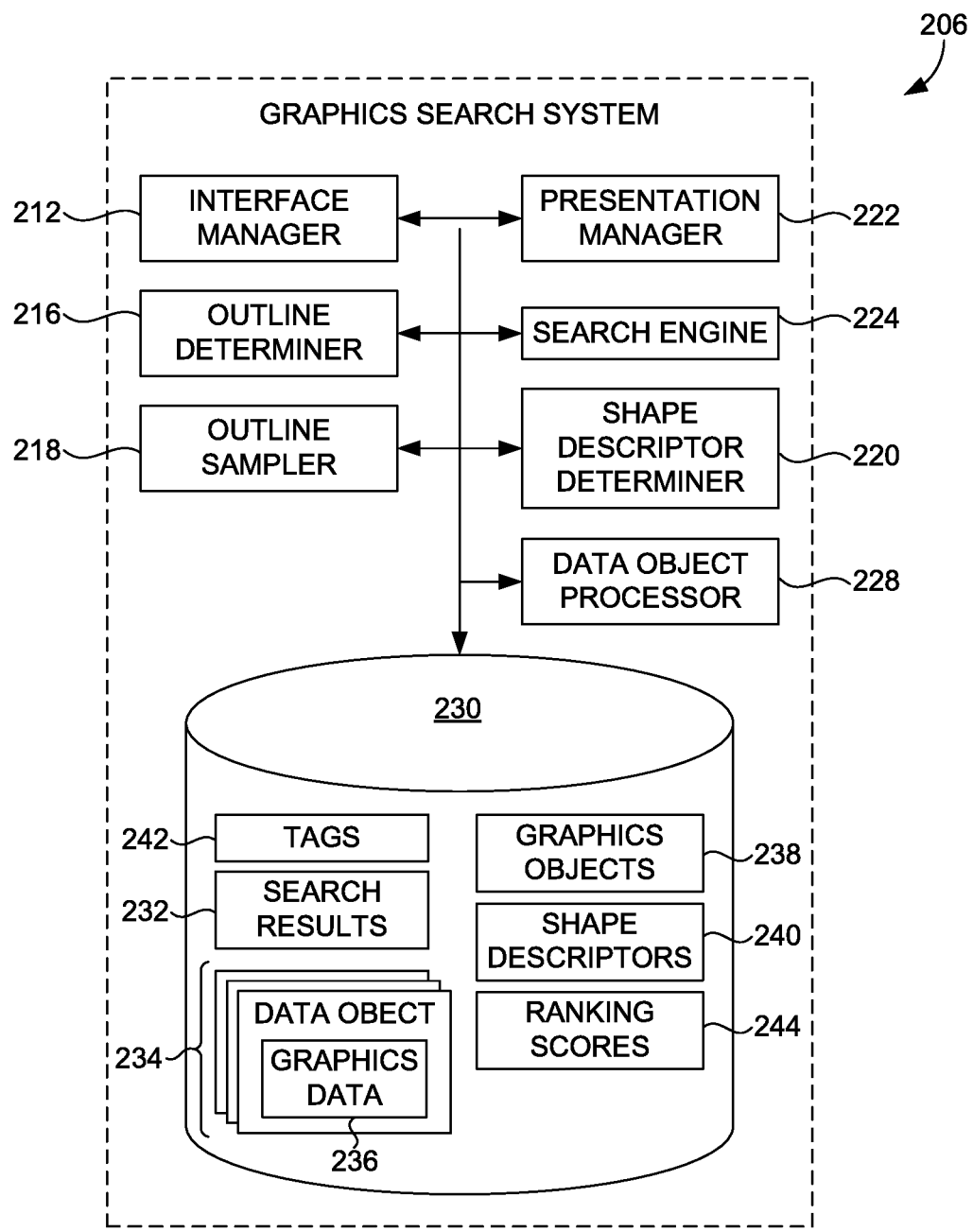
FIG. 2 shows a block diagram of an graphics search system, in accordance with embodiments of the present disclosure.

FIG. 2 shows a block diagram of a graphics search system, in accordance with embodiments of the present disclosure. Graphics search system 206, which can correspond to graphics search system 106 of FIG. 1, includes interface manager 212, outline determiner 216, outline sampler 218, shape descriptor determiner 220, presentation manager 222, search engine 224, data object processor 228, and storage 230.

Storage 230 can comprise computer-readable media and is configured to store computer instructions (e.g., software program instructions, routines, or services), data, and/or models used in embodiments described herein. In some implementations, storage 230 stores information or data received via and/or generated by the various components of graphics search system 206 and provides the various components with access to that information or data, as needed. In implementations, storage 230 comprises a data store (or computer data storage). Although depicted as a single component, storage 230 may be embodied as one or more data stores (e.g., databases) and may be at least partially in the cloud. Some information, such as data objects, may be stored on a user device (e.g., user device 102A), and other information may be stored externally (e.g., on a server 108). Thus, it should be appreciated that the information in storage 230 may be distributed in any suitable manner across one or more data stores for storage (which may be hosted externally).

Among other potential information, storage 230 includes, as examples, search results 232, data objects 234, graphics objects 238, shape descriptors 240, tags 242, and ranking scores 244. In the present example, each data object 234 comprises a digital image, but could include any number of images. Each data object 234 may be in an image file format (e.g., a bitmap and/or vector file format) or video file format, as examples. For example, each data object 234 may be in a vector image format, such as Scalable Vector Graphics (SVG), Adobe Illustrator (AI), Encapsulated PostScript (EPS), and the like.

In some embodiments, graphics search system 206 comprises data object processor 228 to extract graphics objects 238 from graphics data of data objects 234. As used herein, a data object refers to a storage structure for one or more graphics objects. A graphics object refers to a predetermined set graphics data (e.g., vector graphics data and/or raster graphics data), that collectively represents an image (e.g., geometry, coloration, and the like).

As an overview, interface manager 212 is configured to provide an interface between graphics search system 206 and other entities, such as user devices, users, and/or other systems. Interface manager 212 can receive data indicating an example graphics object for search engine 224 to use for a search query to search for similar graphics objects to the example object. Interface manager 212 can receive this data from one or more user devices, such as in response to a user selection of an example image for an image based search. In response to the search query, search engine 224 can search for graphics objects 238 that have similar shape descriptors as the example graphics objects to include in search results 232. Presentation manager 222 is configured to cause presentation of information on one or more user devices based on search results 232.

Shape descriptor determiner 220 is configured to determine shape descriptors 240 of graphics objects 238 and the example graphics object at any suitable time. Shape descriptor determiner 220 can use outline determiner 216 to determine outlines of each of the graphics objects 238 and the example graphics object. Shape descriptor determiner 220 can further use outline sampler 218 to determine point samples that define the outlines. From the point samples of each graphics object, shape descriptor determiner 220 can determine the shape descriptor of the graphics object.

As mentioned above, interface manager 212 is configured to provide an interface between graphics search system 206 and other entities, such as user devices, users, and/or other systems. Interface manager 212 can receive data indicating an example graphics object for search engine 224 to use for a search query to search for similar graphics objects to the example object. The data can be generated, for example, based on user input to a user device, such as user device 102A (e.g., via application 110). For example, the user input can correspond to a user selection of an option to search for similar graphics objects as an example object (e.g., a search button). In some embodiments, a user identifies to interface manager 212 the example graphics object to use for the search. This may include providing user input that results in a sketch or drawing of the example graphics object. For example, the user may construct the graphics object by free hand drawing and/or using object primitives. As another example, the user could select a data object containing the graphics object to identify the graphics objects. For example, the user could select the data object from a file browser or other interface that provides multiple options for the example object.

Figure 3A:
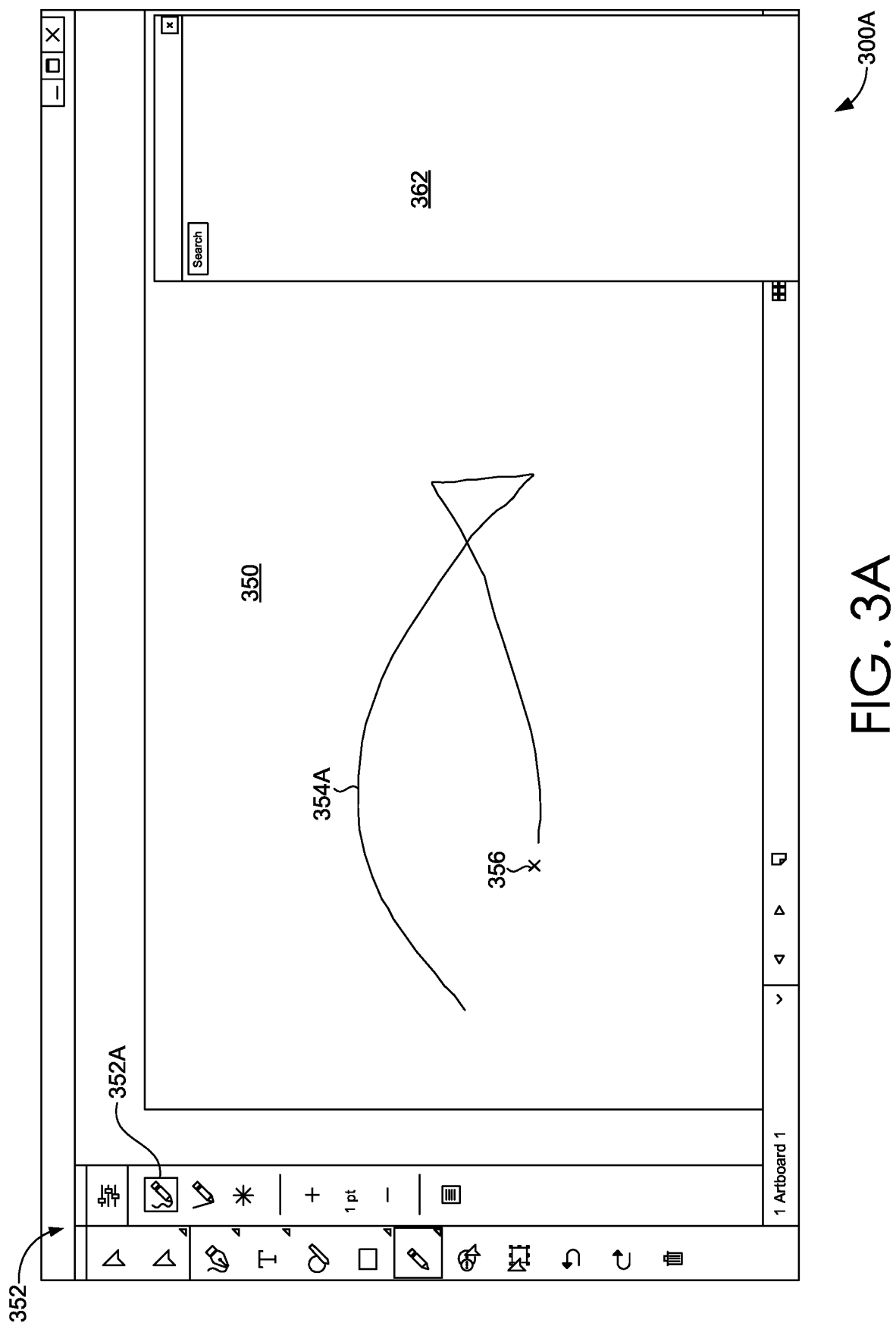
FIGS. 3A-3B show a block diagram of a graphical user interface, in accordance with embodiments of the present disclosure.
Figure 3B:
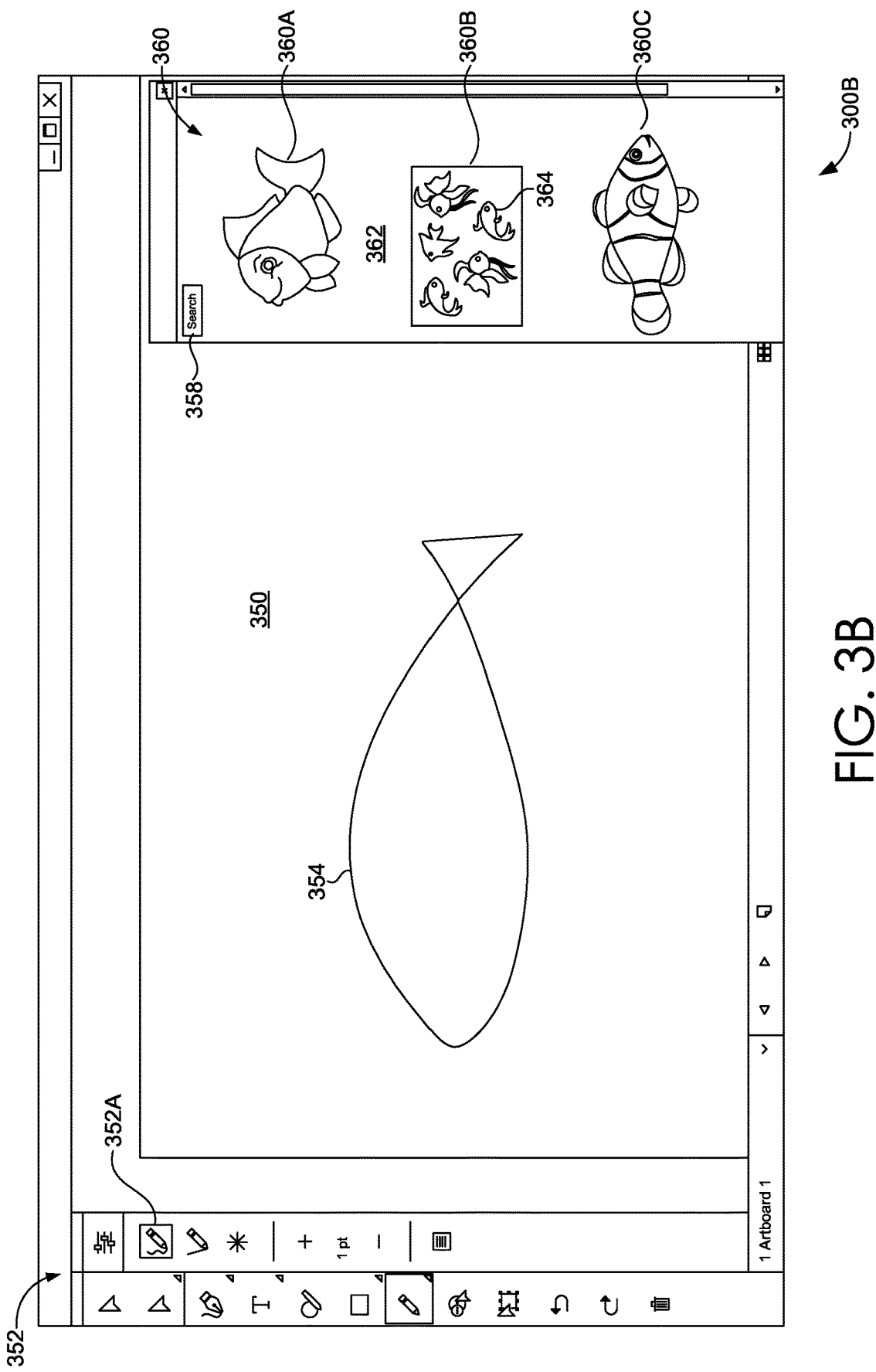

One such example of the forgoing is described with respect to FIGS. 3A and 3B, which illustrate an example of a graphical interface, in accordance with implementations of the present disclosure. Interface manager 212 may handle any combination of the various interfaces between the user, the user device, and/or servers, described with respect to FIGS. 3A and 3B. FIG. 3A shows screen 300A of the graphical interface and FIG. 3B shows screen 300B of the graphics interface. As shown, the graphical interface includes artboard 350, which is configured to display graphics objects. Also included are a plurality of tools 352 in a toolbar, which the user can use to compose a graphics object. For example, screen 300A represents an intermediate version 354A of graphics object 354 of screen 300B as it is being defined by user input. For example, using freehand vector drawing tool 352A, a user has provided user input defining intermediate version 354A of graphics object 354. This may be accomplished by the user input manipulating cursor 356 to define the shape. The user input may be from a finger, a mouse, or a stylus, or other input object and/or device, as examples. Graphics object 354 can comprise vector data and may be formed by a plurality of Bézier curves. For example, the Bézier curves and/or other vector primitives may be interconnected to define the graphics object.

Having completed graphics object 354, a user may provide a user selection of option 358, which instructs graphics search system 206 to search for similar graphics objects using the identified graphics object 354. In the present example, option 358 is a search button, but other graphical interface elements could be employed (e.g., a menu). In some cases, the search could automatically be initiated upon completion of graphics object 354 (e.g., by interface manager 212 automatically detecting completion of graphics object 354).

Selection of option 358 may cause transmission of a corresponding search query from the user device to search engine 224, which may be on a server (e.g., server(s) 108). The search query can identify graphics object 354 as the example object. For example, the search query could include graphics data that defines graphics object 354. In addition or instead, the search query can include a shape descriptor of graphics object 354. For example, shape descriptor determiner 220, outline determiner 216, and/or outline sampler 218 can at least partially be implemented on the user device to determine the shape descriptor of the example graphics object on the client side of operating environment 100. As another example, the shape descriptor could be determined server side. In other embodiments, the search query could include an identifier of the graphics object, such as where the graphics object is a predefined object selected by the user for search (e.g., one of graphics objects 238).

As mentioned above, in response to a search query, search engine 224 can search for graphics objects 238 that have similar shape descriptors as the example graphics objects to include in search results 232. Presentation manager 222 is configured to cause presentation of information on one or more user devices based on search results 232. This can be accomplished by presentation manager 222 transmitting data that causes the presentation. For example, where presentation manager 222 is located on a user device, such as user device 102A (e.g., as part of application 110), presentation manager 222 could communicate data with a service on the device to cause the presentation. Where presentation manager 222 is at least partially located on a server, such as server 108, the data could be transmitted over network 104. Examples of the data can include, for example, any combination of at least one of the graphics objects, data objects containing the graphics objects, ranking scores, the preview images, an order in which to present the graphics objects, an API call to present the objects, and an operating system call to present the preview image.

The transmission of the data could result in the display of preview images shown in FIG. 3B, as an example. Furthermore, rather than displaying multiple images for a particular image effect, in some cases, a highest ranking graphics object and/or data object could be indicated by the presentation. The ranking order of graphics objects for the example graphics object could be indicated by the presentation (e.g., the most similar for that image could be ordered first, and the least suitable last, as indicated by the ranking scores).

In FIG. 3B, for example, presentation manager 222 has caused presentation of search results 360 in search results area 362 of the graphical user interface. Search results 360 include graphics objects, which are presented as preview images 360A, 360B, and 360C of their corresponding data objects, by way of example. For example, preview image 360B corresponds to multiple ones of graphics objects 238, but may be included in search results 360 based on the similarity of graphics object 364 to graphics object 354. In other implementations, the preview image may only represent graphics object 364, rather than each graphics object in a data object.

In various embodiments, one or more graphics objects represented in the search results may be user selectable to import a corresponding graphics object into application 110 (e.g., for editing or other graphics composition). For example, interface manager 212 receive may user input corresponding to a user selection of one or more of the graphics objects represented in search results area 362. This user input could be provided to preview image 360A, for example, to select the corresponding graphics object for importing into artboard 350 or a new artboard, as examples. In some implementations, the user can drag and drop a preview image from search results area 362 into artboard 350 via user input to cause the graphics object to be imported. Optionally, this could automatically cause graphics object 354 to be replaced with the imported graphics object. The user may in some embodiments edit the imported graphics object using tools 352.

Data object processor 228 can be used to identify graphics objects within data objects, such that search descriptors can be identified for those graphics objects, and those graphics objects can be searched. For example, data object processor 228 may identify multiple discrete graphics objects within a single vector art file (e.g., a big, a tree, and a rabbit), and processes the graphics objects to make them individually searchable.

As mentioned above, in some embodiments, graphics search system 206 comprises data object processor 228 that extracts graphics objects 238 from graphics data of data objects 234. For example, each of data objects 234 comprises graphics data, such as graphics data 236. In some embodiments, data object processor 228 can identify multiple graphics objects from a single data object (e.g., a file) and extract and store those graphics objects individually as graphics objects 238. Each of Graphics objects 238 may comprise respective graphics data extracted from the data object and stored as a new data object and/or a pointer or other identifier of a corresponding portion of the graphics data in the data object. Using this approach, graphics search system 206 may search individually for similar graphics objects to an example object that are represented within the same data object, as opposed to considering the data object a single graphics object. For example, assume graphics data 236 comprises a nature scene with a bird, a fox, the sun, and a fish. Using approaches described herein, the fish can be individually matched to graphics object 354 and included in search results 360 as the individual graphics object and/or the original data object.

Various approaches may be used by, data object processor 228 to identify the graphics objects in a data object for extraction. In some implementations, each graphic object may be identified in the data object data based on a description of the graphics objects in the data object. For example, vector files, such as SVG files allow for definitions of groups of graphical elements (e.g., vector elements). Data object processor 228 may identify each group of graphic elements as being a respective graphics object. It is noted that a group can have multiple sub-groups also describing lower level objects that create a complete graphics object. For example, the groups could be part of a tree with nodes that includes groups and/or vector elements. Data object processor 228 could analyze groups in the data object to determine which groups correspond to a graphics object to extract and/or could select a group based on its hierarchical level as graphics object (e.g., select each top level group).

It is noted that in some implementations, at least some of graphics data 236 could comprise raster data, such as where data object 234 corresponds to a bitmap image (e.g., a Joint Photographic Experts Group (JPEG) file). In these cases, data object processor 228 may use any of various object recognition algorithms to identify a subportion of the bitmap image as a graphics object (e.g., using computer vision algorithms for object recognition). Thus, it should be appreciated that in some embodiments, one or more of graphics objects 238 could be formed by or comprise raster graphics data in addition to or instead of vector graphics data. However, in the example of FIGS. 3A and 3B, each graphics object is represented using vector graphics data.

As mentioned above, shape descriptor determiner 220 is configured to determine shape descriptors 240 of graphics objects 238 and the example graphics object. This can occur, for example, as graphics objects 238 are extracted from data objects 234 (e.g., concurrently) and/or after graphics objects 238 are extracted from data objects 234.

Shape descriptor determiner 220 can use outline determiner 216 to determine outlines of each of the graphics objects 238. Various approaches can be used to identify the outline. One approach uses Canny edge detection which calculates the magnitude and angle of a gradient vector of a graphics object. The outline can comprise a continuous representation of a footprint of the graphics object without internal details. As an example, the outline can be formed by a plurality of Bézier curves that may be interconnected. In various implementations, the outline is a vector outline that is represented using vector elements. For example, where a graphics object is a raster object, the outline generated by outline determiner 216 may be a vector outline. Similarly, where a graphics object is a vector object, the outline generated by outline determiner 216 may be a vector outline.

Figure 4A:
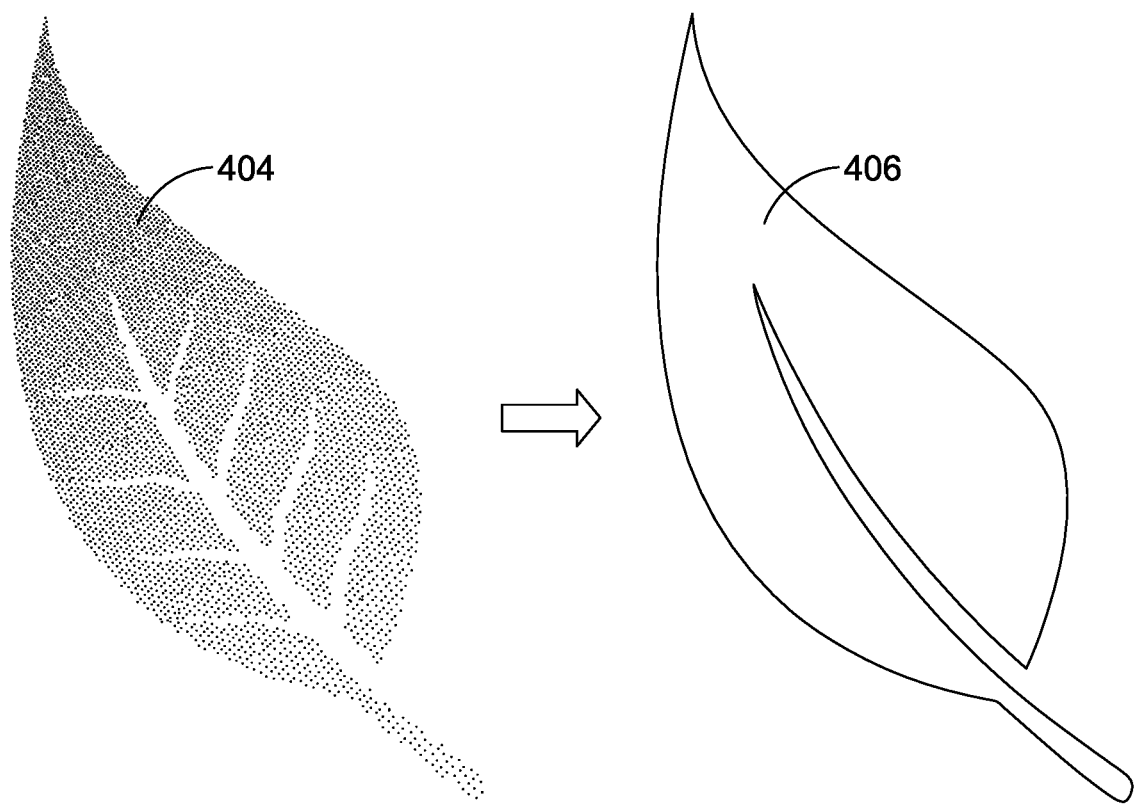
FIG. 4A shows a representation of an outline of a graphics object, in accordance with embodiments of the present disclosure.

FIG. 4A shows a representation of an outline of a graphics object, in accordance with embodiments of the present disclosure. In particular, outline 406 of graphics object 404 may be generated by outline determiner 216. Graphics object 404 is a vector object formed by vector elements. Outline determiner 216 can generate outline 406 by analyzing the vector elements and/or other graphics data that defines graphics object 404. Outline 406 is formed by a plurality of interconnected curves.

Figure 4B:
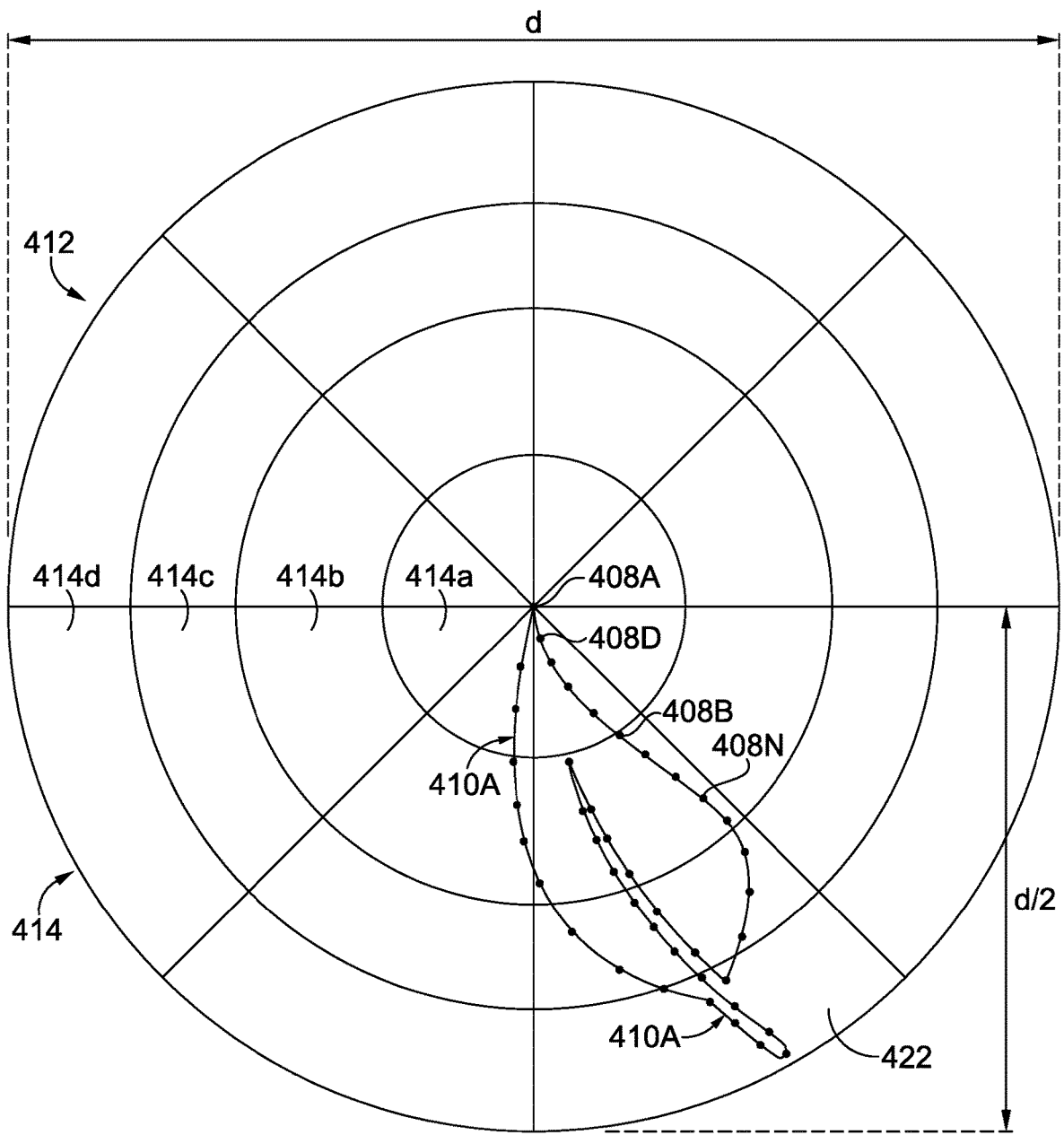
FIG. 4B shows point samples of an outline of a graphics object, in accordance with embodiments of the present disclosure.

Shape descriptor determiner 220 can further use outline sampler 218 to determine point samples that define the outlines. FIG. 4B shows point samples of an outline of a graphics object, in accordance with embodiments of the present disclosure. For example, given an outline determined using outline determiner 216, shape descriptor determiner 220 can analyze that outline to determine point samples 408A, 408B, and 408N. As another example, outline sampler 218 could determine point samples as the outline is generated. Outline sampler 218 can determine the point samples using a point sampling algorithm which captures the outline of the graphics object as a plurality of points. In various implementations, outline sampler 218 determines the point samples based on a curvature of the outline. For example in sampling the outline, point density of the sampled points can be based on the curvature of the outline. As shown in FIG. 4B, outline sampler 218 may provide lower point density for segments of the outline with higher curvature than those with lower curvature. In addition, or instead, outline sampler 218 can determine a number of points for a particular segment based on a length of that segment. For example, outline sampler 218 may sample more points for segments of the outline that are longer than those that are shorter. As shown, segment 410A comprises eleven point samples, whereas segment 410B is shorter and therefore comprises fewer point samples (e.g., four point samples). One suitable algorithm for determining the sampled point is adaptive point sampling.

From the point samples of each graphics object, shape descriptor determiner 220 can determine the shape descriptor of the graphics object. Shape descriptor determiner 220 can determine the local and global geometric properties of each sampled point which may be stored as a respective feature vector of that particular sampled point. The shape descriptor is based on the feature vectors of the sampled points of the graphics object, which may be determined by combining the feature vectors into one or more aggregated feature vectors that constitute the shape descriptor.

Shape descriptor determiner 220 can determine a feature vector for a sampled point using various possible approaches. These include capturing the local and global geometric properties of sampled points in spatial and/or spectral domains. As mentioned above, local and global geometric properties of a sampled point of a graphics object refers to one or more values that represents a geometric relationship between the sampled point relative to other sampled points of the graphics object (e.g., by referencing location geometry of other sampled points to the sampled point). For example, the one or more values for a sampled point may be based on a location of the sampled point relative to locations of other sampled points (e.g., each other sampled point) in the graphics object. The one or more values can each be based on an angle between the sampled point and another sampled point, a proximity of those sampled points, and/or a distance between those sampled points (e.g., direct distance or along the outline of the graphics object).

In an example spatial approach, a spatial histogram is created for each sampled point that captures the relative positions of other sampled points. For example, a geometric object (e.g., a circle) can be centered on a sampled point. The geometric object can be divided into equal sectors and the sectors can be further divided into bins. The feature vector for the sampled point can include a value for each bin, which is a count of the number of other sampled points that fall within that bin.

FIG. 4B illustrates an example of this approach. As shown, geometric object 412 is centered on sampled point 408A. Geometric object 412 and/or the sampled points of outline 406 may be scaled or sized such that regardless of which sampled point geometric object 412 is centered on, all sampled points will fall within geometric object 412. Geometric object 412 comprises equal sectors, such as sector 414, and the sectors are formed by a number of bins. For example, sector 414 is formed by bins 414A, 414B, 414C, and 414D. In some embodiments, geometric object 412 comprises twelve sectors, each containing five bins, for a total of sixty bins. In the example shown, there are eight sectors, each containing four bins, for a clearer depiction of the geometric object. Geometric object 412 is centered on sampled point 408A, and the feature vector for sampled point 408A can include a value for each bin, which in this example is a count of the number of other sampled points that fall within that bin. For example, sampled point 408D is in bin 422 along with three other sampled points for a total count of three. Thus, bin 422 can have a value of four in the feature vector for sampled point 408A. As shown, twenty six of the bins contain no sample point, such that the feature vector may include twenty size zeros, one for each bin that does not contain a sampled point. The feature vector may be normalized such that each value ranges from zero to one.

Shape descriptor determiner 220 can similarly determine a feature vector for each other sampled point. Shape descriptor determiner 220 can combine those feature vectors to form the shape descriptor for the graphics object. In some embodiments, the shape descriptor comprises at least two aggregated feature vectors. Shape descriptor determiner 220 can compute one aggregated feature vector that contains a standard deviation for each value in the sampled point feature vectors. Shape descriptor determiner 220 can compute another aggregated feature vector that contains a mean of each value in the sampled point feature vectors. This is but one example, any number of feature vectors could be used as a shape descriptor (or another form of aggregated metric). By combining the feature vectors of the sampled points, shape descriptors 240 can consume lower storage space, and can reduce the processing power needed by search engine 224 to compare shape descriptors.

Thus, for each graphics object, shape descriptor determiner 220 may in some embodiments determine two feature vectors that form the shape descriptor of that graphics object. Search engine 224 can search for graphics objects that have similar shape descriptors as an example graphics object to include in search results. In particular, the shape descriptors can be used by search engine 224 as at least one factor in evaluating the similarity between graphics objects. Search engine 224 can determine the similarity between a given graphics object and the example object based on a comparison between the shape descriptors of the graphics objects. For example, the more similar the shape descriptors, the more similar the overall shape of the graphics objects, increasing the likelihood a graphics object will be included as a search result. In various embodiments, search engine 224 determines the similarity between shape descriptors by determining a cosine similarity between the feature vectors, which may result in a similarity score for each graphics object. The similarity score can be used to rank the graphics objects, and the graphics objects (and/or their corresponding data object) can be selected for inclusion in the search results based on the similarity scores.

In some implementations, search engine 224 may include at least some graphics objects in the search results using tags assigned to those graphics objects. For example, at least some of graphics objects 238 may be tagged using any suitable approach according to whether they depict particular types of objects or show particular characteristics (e.g., using machine learning and/or manual tagging). In determining the search results, search engine 224 can determine a graphics object having a similar shape as the example object by analyzing its shape descriptor, as described above. Others of graphics objects 238 may be included in the search results based on sharing a similar or same tag as the determined graphics object. For example, if the graphics object is tagged with bird, one or more other graphics objects tagged with bird may be included in the search results.

Using this approach, in some cases, shape descriptor determiner 220 need not determine a shape descriptor for and/or search engine 224 need not analyze the shape descriptors of at least some of graphics objects 238. This can reduce processing and storage requirements for generating the search results. For example, the tags may be determined using a conventional approach that assigns a confidence score to each tag and object or image pair for each graphics object. A subset of items (e.g., one or more graphics objects or images) may be selected for each tag based on the confidence score of the tag (e.g., the top ten scored items for each tag). Shape descriptors may then be determined for only this subset of items and other items may be included in search results with an item from the subset based on having the same or similar tags as the item. Thus, for example, shape descriptors for one or more graphics objects that are highly correlated with a particular tag may be determined without having to determine shape descriptors for each graphics object tagged with that tag. However, those graphics objects that do not have shape descriptors can still be included in search results when they have a similar tag to the tag of a graphics object that is include in the search results based on its shape descriptor.

Figure 5:
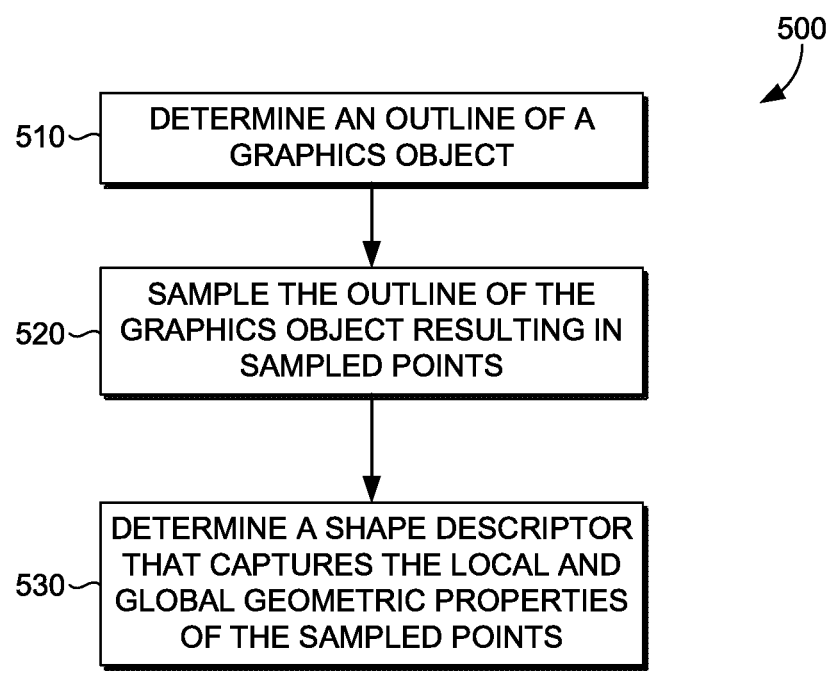
FIG. 5 is a flow diagram showing a method determining a shape descriptor of a graphics object, in accordance with embodiments of the present disclosure.

Referring now to FIG. 5, a flow diagram is provided showing an embodiment of a method 500 for determining a shape descriptor of a graphics object. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 510, method 500 includes determining an outline of a graphics object. For example, outline determiner 216 can determine an outline of a graphics object of graphics objects 238 from graphics data 236 that forms the graphics object.

At block 520, method 500 includes sampling the outline of the graphics object resulting in sampled points. For example, outline sampler 218 can sample the outline of the graphics object resulting in sampled points that capture the outline of the graphics object.

At block 530, method 500 includes determining a shape descriptor of the graphics object that captures the local and global geometric properties of the sampled points. For example, shape descriptor determiner 220 can determine a shape descriptor of the graphics object where the shape descriptor captures local and global geometric properties of each sampled point.

Figure 6:
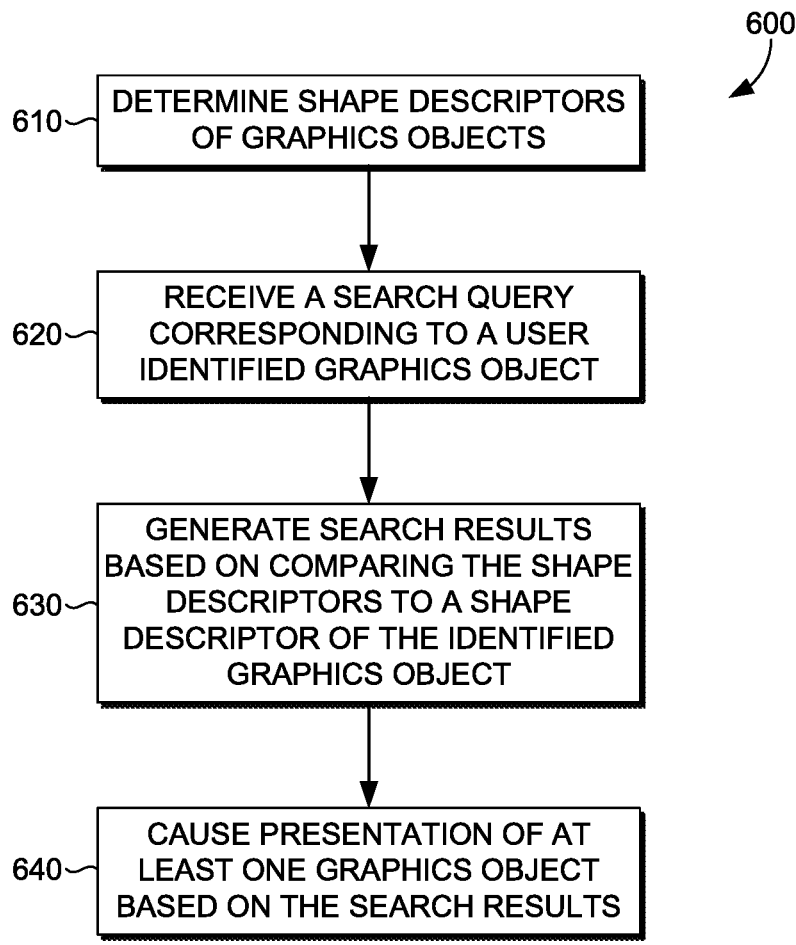
FIG. 6 is a flow diagram showing another method for searching images based on shape descriptors, in accordance with embodiments of the present disclosure.

With reference to FIG. 6, a flow diagram is provided showing an embodiment of a method 600 for searching images based on shape descriptors.

At block 610, method 600 includes determining shape descriptors of graphics objects. For example, shape descriptor determiner 220 can determine shape descriptors 240 of graphics objects 238. Each shape descriptor may be determined using, for example, method 500 of FIG. 5.

At block 620, method 600 includes receiving a search query corresponding to a user identified graphics object. For example, interface manager 212 can receive a search query corresponding to a user identified graphics object. The graphics object may be graphics object 354 identified by a user of user device 102A using application 110.

At block 630, method 600 includes generating search results based on comparing the shape descriptors to a shape descriptor of the identified object. For example, search engine 224 can generate search results 232 of the search query based on a comparison between the shape descriptor of the user identified graphics object and the shape descriptor of at least one graphics object graphics objects 238. In some embodiments, shape descriptor determiner 220 is at least partially on user device 102A (e.g., part of application 110), which computes the shape descriptor of graphics object 354 and transmits the shape descriptor to server(s) 108 in the search query, which comprise search engine 224.

At block 640, method 600 includes causing presentation of at least one graphics object based on the search results. For example presentation manager 222 can cause presentation of at one of the search results on user device 102A. This can include using interface manager 212 to transmit at least some of the search results to user device 102A for display on the device or otherwise transmitting data which causes the display. For example, search results 360 may be displayed on user device 102A.

Figure 7:
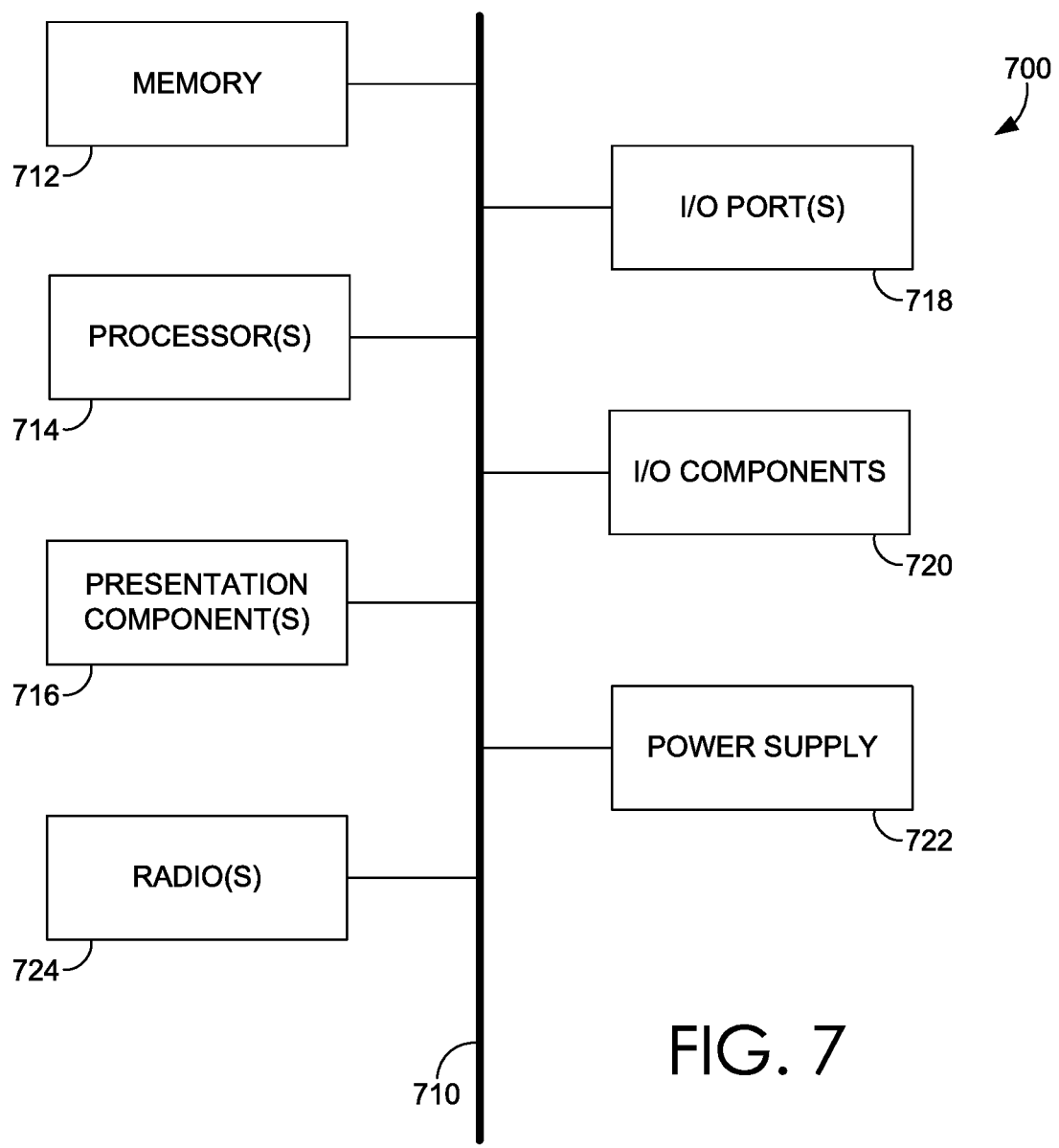
FIG. 7 is a block diagram of an exemplary computing environment suitable for use in implementing embodiments of the present disclosure.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method for searching graphics, the method comprising:
    analyzing each graphics object of a set of graphics objects, the analyzing comprising:
        sampling an outline of the graphics object resulting in sampled points that capture the outline of the graphics object, and
        determining a shape descriptor of the graphics object, the shape descriptor capturing local and global geometric properties of each of the sampled points, wherein determining the shape descriptor of the graphics object comprises:
            determining, for each sampled point of the sampled points, a feature vector representing the local and global geometric properties of the sampled point, and
            combining corresponding values from the feature vector of each sampled point into a combined feature vector, wherein the shape descriptor comprises the combined feature vector;
    receiving a search query corresponding to a user identified graphics object; and
    generating a search result of the search query including at least one graphics object of the set of graphics objects selected based on a comparison between a shape descriptor of the user identified graphics object and the shape descriptor of each graphics object of the set of graphics objects.

2. The computer-implemented method of claim 1, wherein the outline of the graphics object comprises a vector graphic.

3. The computer-implemented method of claim 1, further comprising:
    loading a data object comprising vector graphics data, the vector graphics data comprising graphics data of each graphics object of the set of graphics objects;
    identifying the set of graphics objects in the vector graphics data of the loaded data object, each graphics object corresponding to a respective vector graphic in the vector graphics data; and
    based on the identifying the set of graphics objects, performing the analyzing of each graphics object of the set of graphics objects.

4. The computer-implemented method of claim 1, wherein the generating of the search result comprises:
    identifying a tag assigned to a given graphics object, wherein the comparison is between the shape descriptor of the user identified graphics object and the shape descriptor of the given graphics object;
    based on the comparison, identifying a plurality of graphics objects assigned to the tag; and
    adding the identified plurality of graphics objects to a set of search results of the search query.

5. The computer-implemented method of claim 1, wherein the sampling of the outline comprises a number of sampled points for a segment of the outline is based on a length of the segment.

6. The computer-implemented method of claim 1, wherein the outline of a given graphics object is formed by a plurality of Bezier curves.

7. The computer-implemented method of claim 1, comprising:
    determining the local and global geometric properties of a sampled point of each of the sampled point using a spatial histogram, wherein a bin of the spatial histogram represents a respective spatial region, and a value of the bin is based on a number of neighboring ones of the sampled points within the respective spatial region; and determining a spatial descriptor from the spatial histogram.

8. The computer-implemented method of claim 1, further comprising causing presentation of the search result on a user device associated with the search query, the presentation comprising transmitting an indicator of the search result to the user device.

9. The computer-implemented method of claim 1, further comprising:

extracting the set of graphics objects from a vector graphics file, wherein each graphics object is a vector graphic; and storing each extracted graphics object and the shape descriptor of the graphics object in a database, wherein the generating of the search result comprises processing the search query against the database.

10. At least one non-transitory computer-readable media having executable instructions embodied thereon, which, when executed by at least one processor, causes the at least one processor to perform a method for searching graphics, the method comprising:

sampling an outline of a user-identified graphics object resulting in sampled points that capture the outline of the user-identified graphics object;

determining a shape descriptor of the user-identified graphics object, the shape descriptor capturing local and global geometric properties of each of the sampled points, wherein determining the shape descriptor of the user-identified graphics object comprises:

determining, for each sampled point of the sampled points, a feature vector representing the local and global geometric properties of the sampled point, and combining corresponding values from the feature vector of each sampled point into a combined feature vector, wherein the shape descriptor comprises the combined feature vector;

transmitting a search query comprising the shape descriptor to a search engine;

receiving, from the search engine, search results in response to the search query, the search results identifying at least one graphics object based on similarities between the shape descriptor of the user-identified graphics object and at least one other shape descriptor of the at least one graphics object determined by sampling at least one other outline of the at least one graphics object; and presenting the at least one graphics object on a user device associated with the search query.

11. The computer-readable media of claim 10, wherein the presenting the at least one graphics object comprises presenting a plurality of preview images comprising graphics objects of the search results.

12. The computer-readable media of claim 10, wherein the presenting the at least one graphics object comprises importing the at least one graphics object into an artboard of a graphics editing application.

13. The computer-readable media of claim 10, further comprising:

translating a stream of user input into a digital sketch comprising the user-identified graphics object, the digital sketch being displayed in a graphics editing application;

receiving a user selection of a search button displayed with the digital sketch; and based on the receiving of the user selection, performing the presenting of the at least one graphics object in the graphics editing application.

14. The computer-readable media of claim 10, wherein the sampling of the outline comprises a number of sampled points for a segment of the outline is based on a length of the segment.

15. A computer-implemented system for searching graphics, the system comprising:

at least one processor; and at least one data storage device communicably coupled with the at least one processor, wherein the data storage device comprises a non-transitory computer storage medium storing computer-useable instructions executable by the at least one processor, wherein the computer-usable instructions comprise:

an outline sampler for sampling outlines of graphics objects resulting in sampled points that capture the outlines of the graphics objects;

a shape descriptor determiner for determining shape descriptors of the graphics objects, each shape descriptor capturing local and global geometric properties of the sampled points of a corresponding graphics object, wherein the determining of the shape descriptors comprises:

determining, for each sampled point of the sampled points, a feature vector representing the local and global geometric properties of the sampled point, and combining corresponding values from the feature vector of each sampled point into a combined feature vector, wherein the shape descriptor comprises the combined feature vector, and a search engine for generating search results of a search query based on a comparison between the shape descriptor of a graphics object corresponding to the search query and the shape descriptor of at least one of the graphics objects, wherein the search results include the at least one of the graphics objects.

16. The computer-implemented system of claim 15, the computer-usable instructions further comprising an interface manager for:

receiving the search query from a user device; and providing the search results to the user device for presentation of at least some of the search results.

17. The computer-implemented system of claim 15, the computer-usable instructions further comprising an interface manager of a server for:

receiving, at the server, the search query in at least first one or more network communications from a user device; and providing the search results to the user device in at least second one or more network communications for presentation of at least some of the search results.

\* \* \* \* \*